United States Patent
Koukkari et al.

(10) Patent No.: US 9,461,475 B2
(45) Date of Patent: Oct. 4, 2016

(54) ELECTRICAL SYSTEM HAVING A DC LINK

(71) Applicant: ABB OY, Helsinki (FI)

(72) Inventors: Juha Koukkari, Helsinki (FI); Tuomo Leppinen, Helsinki (FI); Teemu Ronkainen, Helsinki (FI)

(73) Assignee: ABB Technology OY, Helsinki (FI)

( * ) Notice: Subject to any disclaimer, the term of this patent is extended or adjusted under 35 U.S.C. 154(b) by 510 days.

(21) Appl. No.: 13/937,802

(22) Filed: Jul. 9, 2013

(65) Prior Publication Data

US 2014/0008977 A1    Jan. 9, 2014

(30) Foreign Application Priority Data

Jul. 9, 2012 (EP) ..................................... 12175493

(51) Int. Cl.
*H02J 4/00* (2006.01)
*B60L 11/12* (2006.01)
*B60L 1/00* (2006.01)

(52) U.S. Cl.
CPC .................. *H02J 4/00* (2013.01); *B60L 1/003* (2013.01); *B60L 1/20* (2013.01); *B60L 11/123* (2013.01); *Y02T 10/6217* (2013.01); *Y02T 10/7077* (2013.01); *Y10T 307/344* (2015.04)

(58) Field of Classification Search
USPC .............................. 307/23; 318/375, 376, 380
See application file for complete search history.

(56) References Cited

U.S. PATENT DOCUMENTS

| | | |
|---|---|---|
| 8,025,115 B2 | 9/2011 | King et al. |
| 2004/0238243 A1 | 12/2004 | King et al. |
| 2005/0005814 A1* | 1/2005 | Kumar ............... B60K 6/28 105/35 |
| 2011/0260661 A1 | 10/2011 | Vilar |

FOREIGN PATENT DOCUMENTS

| | | |
|---|---|---|
| CN | 2915591 Y | 6/2007 |
| DE | 10 2004 057100 A1 | 6/2006 |

(Continued)

OTHER PUBLICATIONS

Office Action (Notification of the First Office Action) issued on Jan. 30, 2015, by the State Intellectual Property Office of People's Republic of China in corresponding Chinese Patent Application No. 201310279460.8, and an English Translation of the Office Action. (21 pages).

(Continued)

*Primary Examiner* — Rexford Barnie
*Assistant Examiner* — Xuan Ly
(74) *Attorney, Agent, or Firm* — Taft Stettinius & Hollister LLP (57) ABSTRACT

An electrical system and method include a DC link, a controlled rectifier connected between the DC link and a power source, an energy storage, a DC to DC converter connected between the DC link and the energy storage, a motor, and a DC to AC converter connected between the DC link and the motor. The converters are configured to transfer power in both directions. The rectifier controls the DC voltage of the DC link when the DC link voltage is in a first voltage range. The DC to DC converter controls the DC voltage of the DC link by charging the energy storage when the DC link voltage is in a second voltage range, which has higher voltage values than the first voltage range, or by discharging the energy storage when the DC link voltage is in a third voltage range, which has lower voltages than the first voltage range.

20 Claims, 3 Drawing Sheets

(56) References Cited

FOREIGN PATENT DOCUMENTS

| DE | 10 2006 022706 B3 | | 1/2008 |
|---|---|---|---|
| DE | 102006022706 | * | 3/2008 |

OTHER PUBLICATIONS

Search Report issued on Apr. 22, 2013, by the European Patent Office for Application No. 12175493.

* cited by examiner

ELECTRICAL SYSTEM HAVING A DC LINK

RELATED APPLICATION

This application claims priority under 35 U.S.C. §119 to European Patent Application No. 12175493.1 filed in Europe on Jul. 9, 2012, the entire content of which is hereby incorporated by reference in its entirety.

FIELD

The present disclosure relates to electrical systems. More particularly, the present disclosure relates to electrical systems having a power source, one or more energy storages and one or more loads connected to a common DC link.

BACKGROUND INFORMATION

In an electrical system with a DC link, an electrical power source produces electrical power to a DC link to which one or more electrical motors are connected for driving a load. In such an electrical system, the electrical power source is, for example, a generator that is driven with a main power source, for example, a diesel engine. The diesel engine rotates the generator, and the generator output is rectified and fed to the DC link.

The electrical motors connected to the DC link may be connected to the DC link by using a DC to AC converter, for example, an inverter. Such an inverter takes power from the DC link and controls the motor in a desired manner. In electrical systems with DC links, the motors connected to the DC link may be in such a use in which the motors need to be accelerated and decelerated more or less periodically. The deceleration of the motors can be carried out using regenerative braking. In regenerative braking, the inverter is controlled in such a way that braking power is fed back to the DC link. The ability to feed power back to the DC link by using kinetic energy of the load enhances the energy efficiency because less power is required from the main power source.

An electrical system using a DC link can have multiple inverters driving motors. Further, the power rating of the largest motors can be considerable compared with the capacity of the main power source, and the temporary power consumption of the loads connected to the DC link can be higher than the capacity of the main power source. For that reason and to further improve the efficiency of the system, the DC link may be equipped with electricity storage means, for example, batteries, capacitors or super capacitors. Such electricity storage means are connected to the DC link by using DC to DC converters that can transfer power in both directions. The energy storages can be used for storing energy that can be then used for powering the loads connected to the DC link. Thus, the regenerative power can be used at the same time by other equipment or stored to the electricity storage means.

In the case where the regenerative power fed to the DC link is higher than the consumption of the other loads and energy storages are full or power feed to the energy storage cannot be increased, the regenerative power fed to the DC link has to be dissipated. The dissipation of power can be carried out with brake choppers that are connected to the DC link and that feed power to a resistive component which dissipates excessive energy to heat.

The above-described electrical systems with DC links are used or can be used in connection with different diesel-electric or hybrid-electric vehicles or working machines, for example, off-road mining trucks, dumpers, wheel loaders, excavators and drilling rigs. Further applications employing such electrical systems include container handling machinery, different marine applications and on-road trucks and busses.

The control of individual apparatuses connected to a common DC link is carried out by using a higher-level controller structure, for example, a PLC (programmable logic controller). The controller is connected to each of the devices in the system by using a communications protocol, for example, profibus or CAN. The higher-level controller controls each converter of the system separately by using measured DC voltage of the DC link and the power balance of the system. The problem relating to known system relates to voltage control of the DC link voltage. As the higher-level controller is connected to the system by using communications interface, the control delays can lead to tripping of the whole system. If, for example, the power of one load is suddenly changed, the power balance in the system is disturbed. Due to communication delays in the power balance controller of the higher-level controller, the controller does not have enough time to react to the abruptly changed conditions and to adjust the reference values accordingly for the other converters of the system, and the whole electrical system can collapse.

SUMMARY

An exemplary embodiment of the present disclosure provides an electrical system having a DC link. The exemplary system includes a controlled rectifier having an input and an output, and an electrical power source connected to the input of the controlled rectifier. The output of the controlled rectifier is connected to the DC link. The exemplary system also includes means for storing electrical energy, and at least one DC to DC converter connected between the DC link and the means for storing electrical energy, where the at least one DC to DC converter being configured to transfer power in both directions. In addition, the exemplary system includes a motor, and at least one DC to AC converter connected between the DC link and the motor, where the at least one DC to AC converter being configured to transfer power in both directions. The controlled rectifier includes means for controlling the DC voltage of the DC link when the voltage of the DC link is in a first voltage range. The at least one DC to DC converter is configured to control the DC voltage of the DC link by at least one of (i) charging the means for storing electrical energy when the voltage of the DC link is in a second voltage range, the second voltage range having higher voltage values than the first voltage range, and (ii) discharging the means for storing electrical energy when the voltage of the DC link is in a third voltage range, the third voltage range having lower voltages than the first voltage range. The at least one DC to AC converter is configured to control the DC voltage of the DC link by at least one of (i) reducing a generated power produced by the motor when the voltage of the DC link is in a fourth voltage range, the fourth voltage range having higher voltage values than the second voltage range, and (ii) reducing a motoring power taken by the motor when the voltage of the DC link is in a fifth voltage range, the fifth voltage range having lower voltage values than the third voltage range.

An exemplary embodiment of the present disclosure provides a method in an electrical system having a DC link. The exemplary system includes a controlled rectifier having an input and an output, and an electrical power source connected to the input of the controlled rectifier. The output of the controlled rectifier is connected to the DC link. The exemplary system also includes means for storing electrical energy, and at least one DC to DC converter connected between the DC link and the means for storing electrical energy, where the at least one DC to DC converter being configured to transfer power in both directions. In addition, the exemplary system includes a motor, and at least one DC to AC converter connected between the DC link and the motor, where the at least one DC to AC converter being configured to transfer power in both directions. The exemplary method includes controlling, by the controlled rectifier, the DC voltage of the DC link when the voltage of the DC link is in a first voltage range. The exemplary method includes controlling, by the at least one DC to DC converter, the DC voltage of the DC link by at least one of (i) charging the means for storing electrical energy when the voltage of the DC link is in a second voltage range, the second voltage range having higher voltage values than the first voltage range, and (ii) discharging the means for storing electrical energy when the voltage of the DC link is in a third voltage range, the third voltage range having lower voltages than the first voltage range. In addition, the exemplary method includes controlling, by the at least one DC to AC converter, the DC voltage of the DC link by at least one of (i) reducing a generated power produced by the motor when the voltage of the DC link is in a fourth voltage range, the fourth voltage range having higher voltage values than the second voltage range, and (ii) reducing a motoring power taken by the motor when the voltage of the DC link is in a fifth voltage range, the fifth voltage range having lower voltage values than the third voltage range.

BRIEF DESCRIPTION OF THE DRAWINGS

Additional refinements, advantages and features of the present disclosure are described in more detail below with reference to exemplary embodiments illustrated in the drawings, in which.

DETAILED DESCRIPTION

Exemplary embodiments of the present disclosure provide a method and a system for implementing the method which overcome the drawbacks associated with known techniques.

Exemplary embodiments of the present disclosure are based on the idea of using individual converters for controlling the DC voltage of the DC link. The responsibility for the voltage control is given to different converters, depending on the DC voltage. Each converter type has different voltage control areas. Each converter determines, on the basis of the DC voltage and set voltage areas, if they should control the DC voltage.

An advantage of the method and the system of the present disclosure is that the dynamic response to disturbances in the voltage is greatly improved. The dynamic control is no longer originated from a higher-level controller because each converter acts individually on the basis of the set voltage limits.

The method and the system improve the security of the operation by minimizing downtime. Even further, the energy capture in the system is better than in the known systems and improves the overall energy efficiency because the reaction times to changing conditions are faster.

The higher-level controller can still give instructions to separate converters. These instructions can be used to set reference values for converters and direct commands to converters in some special situations. However, the DC link voltage control is carried out by individual converters.

Figure 1:
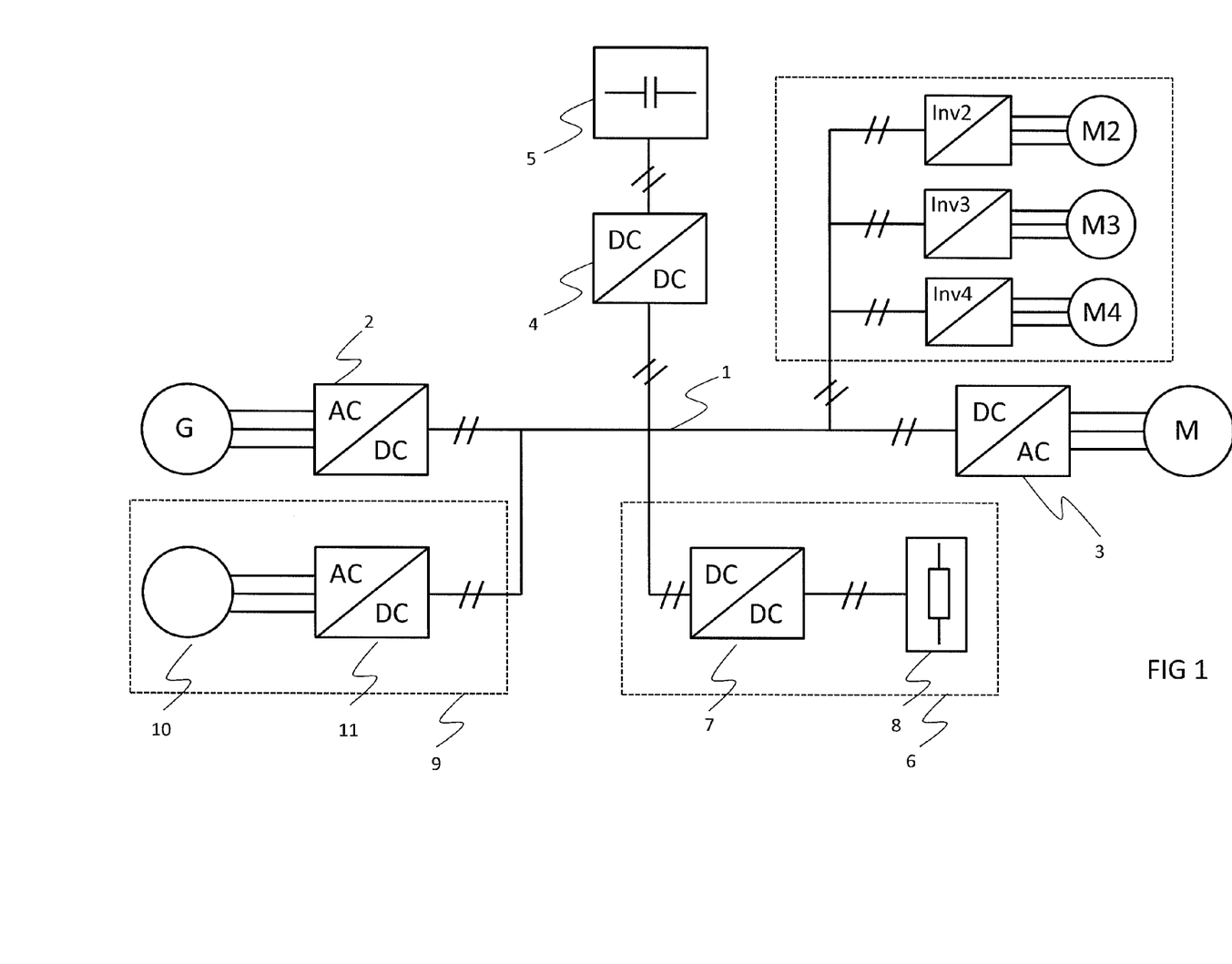
FIG. 1 shows an example of a main circuit of an electrical system having a DC link according to an exemplary embodiment of the present disclosure.

FIG. 1 shows an electrical system having a DC link 1. As known, a DC link is formed of a pair of conducting rails, cables or similar structures that are used for connecting devices. In the example of FIG. 1, a generator G is connected to the system for feeding electrical power through a controllable rectifier 2 that forms an electrical power source. The generator acts as the main power source in the system of FIG. 1. The generator can be a diesel generator and thus the system becomes a diesel-electric system.

The system of FIG. 1 includes a DC to AC converter 3 connected for driving a motor M. The DC to AC converter 3 is an inverter that can be used to control the motor M in a desired manner. The motor M can be a traction motor which drives the wheels of a vehicle, for example. The traction inverter 3 drives the traction motor with high efficiency using the electricity generated by the generator G.

Further, a DC to DC converter 4 is connected to the DC link. The converter 4 is connected to means for storing electrical energy 5 (e.g., an energy storage device). Such means 5 can be, for example, one or more batteries, capacitors or super capacitors. The DC to DC converter 4 is able to charge the electrical storage means 5 when demanded. Electrical energy may be stored, for example, when there is excessive energy available in the DC link 1. The DC to DC converter 4 is also able to feed power to the DC link 1 if the power consumption of the devices connected to the DC link is higher than the power feed from the AC to DC converter 2. It is possible to use energy storage 5 as the main electrical power source if the generator G and the controlled rectifier 2 are not connected. In some applications, the DC to DC converter 4 can be used as the main power source and power from the mains is used for charging the energy storage(s) 5.

According to an exemplary embodiment of the present disclosure, the controlled rectifier 2, 11 or 4 includes means for controlling the DC voltage of the DC link 1 when the voltage of the DC link 1 is in a first voltage range (Zone 0). The DC link voltage can be controlled in the first voltage range by using the energy from the mains or from the energy storages 5. The first voltage range may be, for example, a voltage range that has voltage values both above and below the nominal voltage of the DC link, i.e. the nominal voltage of the DC link and of the devices connected to DC link are within the first voltage range. The controlled rectifier 2, which is also a converter, operates together with the generator G such that when the amount of power is to be changed, the rectifier 2 controls the generator G accordingly. The controller of the rectifier may be a proportional-integral (PI) controller, for example. When the DC link voltage is in the first voltage range, the DC to DC converter 4 operates to charge or discharge the energy storages 5 according to the reference given by the higher-level control system. The charging or discharging of the energy storages 5 is fully controllable by the higher-level control. For example, even in the first voltage range, the higher-level control can control to discharge the energy storages 5 with full power and to obtain the rest of the required voltage from the main power source.

Further, when the voltage of the DC link is in a second voltage range (Zone 1), the DC to DC converter 4 is configured to control the DC voltage of the DC link 1. The second voltage range is above the first voltage range (Zone 0). Thus, when the voltage of the DC link is above the first voltage range in the second voltage range, the DC link voltage is controlled by using the DC to DC converter 4. Since in the second voltage range the voltage of the DC link 1 needs to be lowered, the DC to DC converter 4 charges the energy storages 5 for balancing the production and consumption of the energy if the energy storage is not fully charged.

When the voltage of the DC link is in the first voltage range (Zone 0), the AC to DC converter 2 controls the DC voltage. If the voltage increases to the second voltage range (Zone 1), the DC to DC converter 4 takes charge of the voltage control. At the same time, the AC to DC converter 2 reduces the power to the DC link 1 when the voltage increases from the first range (Zone 0) to the second range (Zone 1). Basically, this means that the AC to DC converter 2 does not produce any power to the DC link 1 when the voltage of the DC link is higher than the upper limit of the first voltage range (Zone 0).

If the DC to DC converter 4 is able to feed enough power in the second voltage range (Zone 1) from the DC link 1 to the storage means 5 and thus control the voltage back to the first voltage range (Zone 0), the control responsibility changes back to the AC to DC converter 2. The amount of power that the DC to DC converter 4 can feed to the storage means 5 depends on the power or current rating of the converter 4. Another limit for the charging is given by the fact that the resources of the energy storage 5 can get used.

If the voltage of the DC link 1 still rises although the AC to DC converter 2 does not produce any power and the DC to DC converter 4 charges the energy storage, the DC voltage enters the fourth voltage range (Zone 3). In the fourth voltage range, the voltage control is carried out by limiting or reducing the generated power produced by the motor M. When the voltage of the DC link 1 increases to the fourth voltage range, the production of the electrical energy with the main power supply is stopped and as much power as possible is stored in the energy storage 5. Thus, in the fourth voltage range, the DC to DC converter 4 charges the energy storages 5 with full capacity. The voltage of the DC link is controlled in the fourth voltage range by the DC to AC converter 3. Once enabled, the controller of the converter 3 realizes that for controlling the voltage regenerative braking must be reduced so that the voltage of the DC link can be lowered.

When the DC voltage is in the fourth voltage range, the sources of power to the DC link 1 are motors that are decelerated by using regenerative braking. In case the motor controlled by the DC to AC converter 3 is a traction motor, some other means for braking the machine may be taken into use for keeping up the braking action.

Once the voltage decreases from the fourth voltage range to the second voltage range, the DC to DC converter 4 starts controlling the DC voltage, and the electrical power source and the AC to DC converter 2 is still in the same position as it was when the voltage rose above the upper limit of the first voltage range, i.e. the AC to DC converter 2 does not produce power. Only when the DC link voltage returns to the first voltage range does the AC to DC converter 2 assume the control responsibility.

When the voltage decreases from the first voltage range below the lower limit of the first voltage range and enters the third voltage range (Zone −1), the controller of the DC to DC converter 4 is activated again. In the first voltage range, the controller of the AC to DC converter 2 controls the voltage and once the voltage decreases, the power from the converter 2 is increased. If the power demand in the system is higher than what the converter 2 can output, the voltage of the DC link 1 sinks. Once it enters the third voltage range, the power output from the AC to DC converter 2 is at its maximum and stays there, and the controller of the DC to DC converter 4 starts to operate. As the voltage is lower than the nominal voltage, the DC to DC converter 4 feeds power from the means for storing electrical energy 5 to the DC link 1 so as to get the voltage of the DC link 1 higher. If the load of the DC to AC converter 3 is reduced and/or the DC to DC converter 4 gets the voltage back to the first voltage range, the control is moved back to the AC to DC converter 2.

If the voltage of the DC link 1 still sinks to values lower than the lower limit of the third voltage range (Zone −1) although the DC to DC converter 4 feeds power to the DC link 1, the load in the system must be reduced. In the fifth voltage range (Zone −3), which has voltage values that are lower than in the third voltage range, the responsibility for control is changed to the DC to AC converter 3, i.e. the inverter feeding a motor. As the voltage is low, the controller of the inverter 3 reduces the load for bringing the system back to balance. When the DC voltage is in the third voltage range, the power feed from both the main power source G, 2 and the energy storages 5 is at the maximum. The reducing of the load basically means that the motor M connected to the electrical system is driven with lower power.

In accordance with an exemplary embodiment of the present disclosure the electrical system, includes a braking chopper 6 connected to the DC link 1. Braking choppers are devices used for dissipating energy and they include a controllable switch and a resistor. The switch is operated for enabling current from the DC link 1 to pass through the resistor, so that power is produced in the resistor. In FIG. 1, the braking chopper 6 is depicted as including a DC to DC converter 7 and a resistor 8. According to an exemplary embodiment, the braking chopper is taken into use when the voltage of the DC link is in the sixth voltage range (Zone 2). The voltages of the sixth voltage range are above the voltages of the second voltage range (Zone 1) and below voltages of the fourth voltage range (Zone 3). In accordance with this exemplary embodiment, once the voltage rises above the upper limit of the second voltage range, the brake chopper 6 controls the voltage of the DC link 1. Thus, when the brake chopper 6 is taken into use, the DC to DC converter feeds power to the energy storage, and the DC to AC converter 3 feeds no power to the DC link 1. If the voltage rises above the upper value of the sixth voltage range, the generated power is reduced, as described above.

In accordance with an exemplary embodiment, electric systems with a DC link include more than one motor. FIG. 1 shows motors M2, M3, M4 and inverters Inv2, Inv3, Inv4 feeding power to the motors from the DC link 1. These other motors and inverters can be of any power rating. When the motoring power or the regenerative power is reduced according to the present disclosure, the motors and the respective inverters should have a priority setting for the order in which the power is reduced. The control responsibility for the control of the DC link voltage is taken by one or more of the inverters, whose power can be regulated. In reduction of the power of the traction motor, if there is one, is generally the one to reduce the power, either consumed or generated. Other motors can operate some auxiliary devices that do not require as much power, and the power cannot typically be regulated.

FIG. 1 also shows an auxiliary power source 9 connected to the DC link 1. The auxiliary power source 9 can be an alternating voltage grid 10 connected to the grid via the controlled rectifier 11. In some occasions, some electrical systems can be connected to the mains. In such a situation, the generator G can be completely shut down. Although operation is from the grid, the electrical system operates as explained above and the controlled rectifier has the control responsibility in the first voltage region. In case of mains connection, the controlled rectifier 11 can also feed power back to the network, thereby helping the control operations when the voltage of the DC link 1 is above the first voltage range. In FIG. 1, the mains voltage is an alternating voltage. However, in some operating environments, the mains supply can be a DC voltage. In such a case, the AC to DC converter 2 is substituted with a DC to DC converter.

In accordance with an exemplary embodiment, the system of the present disclosure can include multiple DC to DC converters charging their own energy storages and/or multiple brake choppers. When multiple devices are present, only one device controls the DC voltage. Other similar devices act as slaves for the controlling device, or additional voltage ranges or sub-ranges are introduced, depending on the energy storage capacity or power rating of each DC to DC converter. In the latter case, the DC to DC converter with the highest power rating is located in the highest voltage range and the DC/DC converter connected to an energy storage having the highest energy capacity is located in the lowest voltage range.

If AC to DC converters 2 and 11 are disconnected, one DC to DC converter (for example, the converter with the highest energy storage capacity) can act as the main power source controlling the DC link voltage in the voltage range 1, and other DC to DC converters (for example, with the highest peak power rating) act in the higher voltage ranges either in slave mode in one voltage range, or each one acts separately in voltage range of its own according to the power rating and energy capacity rule presented above.

The higher-level control system controls other actions of the system and lets the devices control the voltage as described above. The higher-level control system can, for example, monitor the charge level in the electrical energy storages and set current limits for the DC to DC converter charging the energy storages. Further, the higher-level control system can control the DC to DC converter of the energy storages to discharge the storages or to charge the storages when the operation of the control of the DC voltage allows. Similarly, the higher-level control system can be able to send a discharging command to a braking chopper if the power is to be removed from the system.

Figure 2:
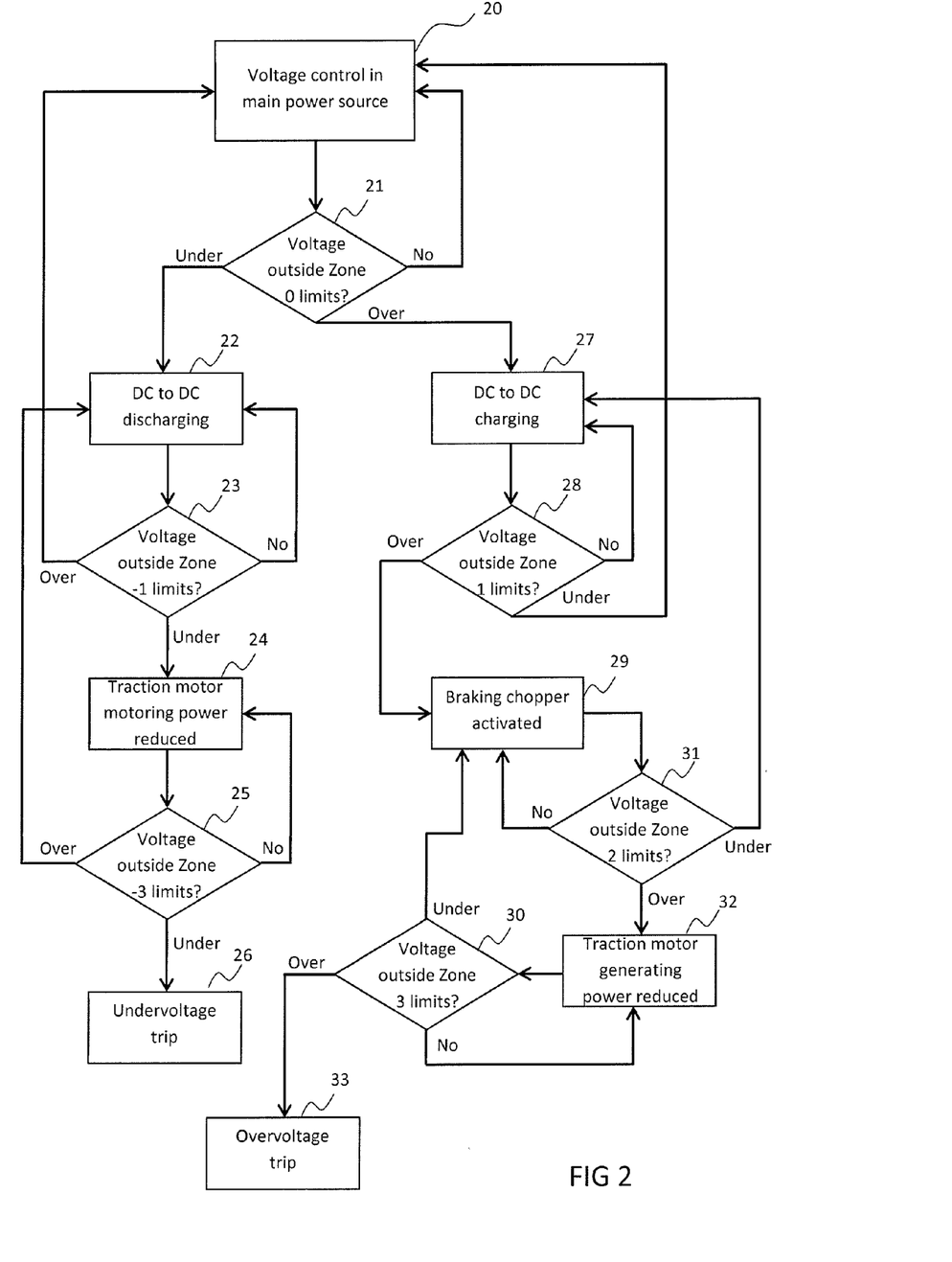
FIG. 2 is a flowchart of an exemplary embodiment of a method according to the present disclosure.

FIG. 2 shows a flowchart of the operation of the system and the method according to an exemplary embodiment of the present disclosure. In the flowchart in block 20, the voltage control responsibility belongs to the main power source, i.e. to the generator with the controlled rectifier 2 (or to the converters 11 or 4), and thus the voltage of the DC link is in the first voltage range (Zone 0). All pieces of equipment that are set to control the DC voltage continuously monitor the DC voltage and compare it with the respective control ranges. In block 21, it is determined if the voltage of the DC link is outside the first voltage range. If the voltage is in the first voltage range, the process returns to block 20.

If the voltage is under the first voltage range, the DC to DC converter 4 takes the control responsibility and begins discharging the energy storages 5. In block 23, it is determined if the voltage of the DC link is outside the third voltage range (Zone −1). If the DC link voltage is over the third voltage range, the process returns to block 20. If the DC link voltage is still in the third voltage range, the process returns to block 22. If the DC link voltage is lower than the lower limit of the third voltage range, then the process moves to block 24, in which the traction motor power is reduced and the voltage control is carried out by the DC to AC converter 3. The DC to AC converter controls the DC voltage by reducing the load.

In block 25, it is determined if the voltage is within the fifth voltage range. If the voltage of the DC link drops below the lower limit value of the fifth range, then one or more of the devices are shut down due to an undervoltage situation 26. If the voltage is higher than the upper value of the fifth voltage range, then the operation is moved to block 22, and if the voltage is in the fifth voltage range (Zone −3), the process is returned to block 24.

Beginning again from block 21 and when the DC link voltage is higher than the upper value of the first voltage range, the process moves to block 27, in which the control is taken over by the DC to DC converter 4, which begins to charge the energy storages. In block 28, it is checked if the voltage is outside the second voltage range (Zone 1). If the voltage is lower than the lower limit value of the second voltage range, the process returns to block 20. If the voltage is higher than the second voltage range, the process continues to block 29, in which the braking chopper 6 begins controlling the DC link voltage. When the braking chopper controls the DC link voltage, it is continuously determined (block 31) if the DC link voltage is outside the sixth voltage range (Zone 2). If the voltage drops below the sixth range, then the process returns to block 27. If the voltage rises above the sixth range, the generated power of the motor is reduced by using the controller of the DC to AC converter 3 in block 32.

Once the DC link voltage is controlled by using the DC to AC converter, it is determined (block 30) if the voltage rises or drops outside the limit values of the fourth voltage range (Zone 3). If the DC link voltage is higher than the upper limit of the fourth voltage range, then the system or parts of the system are stopped due to overvoltage trip 33. If the voltage drops below the fourth voltage range, then the process returns to block 29, and the brake chopper takes the control responsibility.

It is to be noted that in the flowchart of FIG. 2 there is a continuous process, i.e. the operation is continued according to the flowchart depending on the DC link voltage. Each device that has the ability to control the DC link voltage also measures DC voltage or receives DC voltage measurement and automatically starts or stops the control when the measured DC link voltage is in the defined range. Thus, the voltage ranges are stored into the devices. The voltage ranges can be changed dynamically during the operation by using a higher-level control system.

Figure 3:
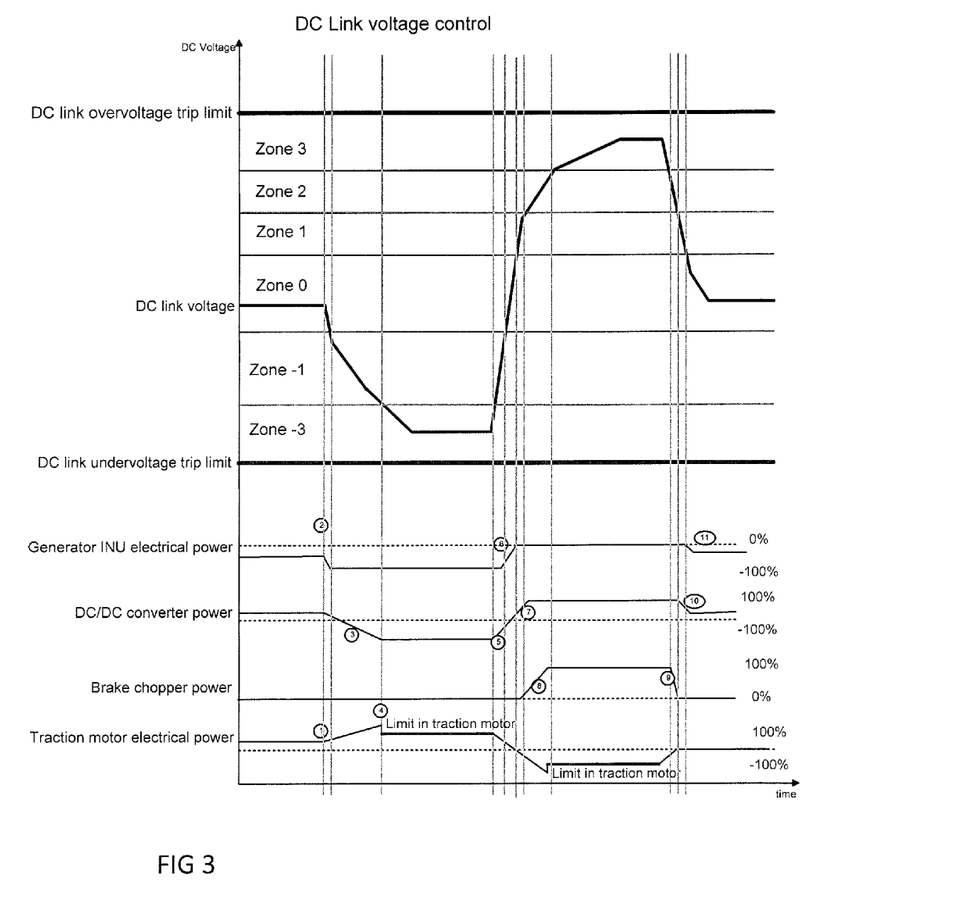
FIG. 3 shows an example of the operation of an exemplary embodiment of the present disclosure.

FIG. 3 shows an example of the operation of an exemplary embodiment of the present disclosure as a function of time. In the example of FIG. 3, a structure is assumed in which a traction motor, generator inverter unit (INU), brake chopper and DC to DC converter with energy storage are connected to a common DC link.

At the beginning, the voltage of the DC link is in Zone 0, i.e. in the first voltage range, and the generator INU controls DC link voltage. Traction motor load starts increasing (1).

At point (2), the generator INU power reaches its maximum power limit. DC to DC converter controls DC link voltage in Zone −1 (3) by starting to discharge energy storages, and at point (4) the DC to DC converter reaches its maximum discharge power or current limit and the traction motor power is limited to avoid undervoltage trip.

At point (5), the power of the traction motor decreases, and the DC to DC converter controls the DC link voltage in Zone −1.

At point (6), the traction motor starts braking to the DC link, and the generator INU takes responsibility for the voltage control and reduces the power to zero. The voltage of the DC link rises and the DC to DC converter takes over the DC link voltage control (7) in Zone 1 (second voltage range).

After the DC to DC converter has reached the maximum charging power or current limit, the brake chopper is activated in (8). Further, the braking power in the traction motor is limited (9) until the DC voltage enters Zone 2 (sixth voltage range). At point (10), the DC to DC converter controls the DC voltage by reducing charging power, and in (11), the DC link voltage returns to Zone 0 (first voltage range), where the generator INU is responsible for the DC link voltage control. The DC to DC converter follows its original reference value from the higher-level controller, for example, a PLC. As seen, the DC to DC converter has a reference for charging the energy storages during the operation in the first voltage range. The charging power can be a function depending on the measured DC link voltage.

Energy storage power supply capabilities are taken into account in the second and third voltage ranges (Zones −1 and 1). In these situations, limit values given by a higher-level control system, for example, a PLC, must not be exceeded. For example, the maximum charging or discharging current of DC to DC converter must not be exceeded.

From a PLC, it is possible to send an energy storage current reference. By means of this reference value, the DC to DC converter is able to charge or discharge the energy storage even outside the second and third voltage ranges (Zones −1 and 1). A similar power reference can be given to a braking chopper. This can be used for example discharging the DC link by the PLC.

According to an exemplary embodiment of the present disclosure, each converter device is configured to measure the DC link voltage. The higher-level controller is configured to receive the measured DC link voltages. If the voltage measurements of the devices differ from each other, the higher-level controller takes care of correcting the measurements or correcting the voltage range values. When the measurements are corrected, the higher-level controller communicates a voltage correction to each converter and each converter corrects the measurements such that the measurements of each device correspond to each other. Another possibility is to correct the limit values of the voltage ranges. The purpose of these corrections is to secure that the voltage control divided between separate devices is operational.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. An electrical system having a DC link, comprising:
   a controlled rectifier having an input and an output;
   an electrical power source connected to the input of the controlled rectifier, the output of the controlled rectifier being connected to the DC link;
   means for storing electrical energy;
   at least one DC to DC converter connected between the DC link and the means for storing electrical energy, the at least one DC to DC converter being configured to transfer power in both directions;
   a motor; and
   at least one DC to AC converter connected between the DC link and the motor, the at least one DC to AC converter being configured to transfer power in both directions, wherein:
   the controlled rectifier comprises means for controlling the DC voltage of the DC link when the voltage of the DC link is in a first voltage range, wherein the at least one DC to DC converter is configured to control the DC voltage of the DC link by at least one of (i) charging the means for storing electrical energy when the voltage of the DC link is in a second voltage range, the second voltage range having higher voltage values than the first voltage range, and (ii) discharging the means for storing electrical energy when the voltage of the DC link is in a third voltage range, the third voltage range having lower voltages than the first voltage range; and
   the at least one DC to AC converter is configured to control the DC voltage of the DC link by at least one of (i) reducing a generated power produced by the motor when the voltage of the DC link is in a fourth voltage range, the fourth voltage range having higher voltage values than the second voltage range, and (ii) reducing a motoring power taken by the motor when the voltage of the DC link is in a fifth voltage range, the fifth voltage range having lower voltage values than the third voltage range.

2. A system according to claim 1, comprising:
   a braking chopper connected to the DC link,
   wherein the braking chopper is configured to control the voltage of the DC link by dissipating power from the DC link when the voltage of the DC link is in a sixth voltage range, the sixth voltage range having higher voltage values than the second voltage range and lower voltage values than the fourth voltage range.

3. A system according to claim 1, comprising:
   a higher-level controller connected to the converter devices.

4. A system according to claim 1, wherein the controlled rectifier is configured to reduce a feeding of power to the DC link to a minimum level when the voltage of the DC link is in at least one of the second, sixth and fourth voltage ranges.

5. A system according to claim 1, wherein the controlled rectifier is configured to feed power to the DC link with its maximum power when the voltage of the DC link is below the voltages of the first voltage range.

6. A system according to claim 1, wherein the system is a diesel-electric system in which the electrical power source connected to the controlled rectifier is a generator driven by a diesel engine.

7. A system according to claim 1, wherein the electrical power source connected to the controlled rectifier includes at least one electrical power storage of the means for storing electrical energy.

8. A system according to claim 1, wherein each of the converters connected to the DC link comprises means for measuring the DC link voltage for starting control of the DC link voltage autonomously.

9. A system according to claim 1, wherein the motor is a traction motor.

10. A system according to claim 1, comprising:
a plurality of DC to DC converters connected to the DC link and to the means for storing electrical energy,
wherein at least one of the second and third voltage ranges comprises sub-ranges, and
wherein the plurality of DC to DC converters are configured to control the DC voltage of the DC link when the voltage of the DC link is in the respective sub-range.

11. A system according to claim 10, wherein the DC to DC converter having the highest power rating among the plurality of DC to DC converters is configured to control the DC voltage in the sub-range having the highest voltage values.

12. A system according to claim 10, wherein the DC to DC converter having the highest energy capacity among the plurality of DC to DC converters is configured to control the DC voltage in the sub-range having the lowest voltage values.

13. A system according to claim 3, wherein:
each converter device is configured to measure the DC link voltage;
the higher-level controller is configured to receive the measured DC link voltages and to communicate voltage corrections to each converter device; and
each converter device is configured to correct its voltage measurement such that the voltage measurements correspond to each other.

14. A system according to claim 3, wherein:
each converter device is configured to measure the DC link voltage;
the higher-level controller is configured to receive the measured DC link voltages and to communicate voltage corrections to each converter device; and
each converter device is configured to change limit values of the voltage ranges for compensating errors in the measurements.

15. A method in an electrical system having a DC link, wherein the electrical system includes:
a controlled rectifier having an input and an output;
an electrical power source connected to the input of the controlled rectifier, the output of the controlled rectifier being connected to the DC link;
means for storing electrical energy,
at least one DC to DC converter connected between the DC link and the means for storing electrical energy, the at least one DC to DC converter being configured to transfer power in both directions;
a motor; and
at least one DC to AC converter connected between the DC link and the motor, the at least one DC to AC converter being configured to transfer power in both directions, wherein the method comprises:
controlling, by the controlled rectifier, the DC voltage of the DC link when the voltage of the DC link is in a first voltage range;
controlling, by the at least one DC to DC converter, the DC voltage of the DC link by at least one of (i) charging the means for storing electrical energy when the voltage of the DC link is in a second voltage range, the second voltage range having higher voltage values than the first voltage range, and (ii) discharging the means for storing electrical energy when the voltage of the DC link is in a third voltage range, the third voltage range having lower voltages than the first voltage range; and
controlling, by the at least one DC to AC converter, the DC voltage of the DC link by at least one of (i) reducing a generated power produced by the motor when the voltage of the DC link is in a fourth voltage range, the fourth voltage range having higher voltage values than the second voltage range, and (ii) reducing a motoring power taken by the motor when the voltage of the DC link is in a fifth voltage range, the fifth voltage range having lower voltage values than the third voltage range.

16. A system according to claim 1, wherein the first to fifth voltage ranges do not overlap each other such that voltage values in one of the first to fifth voltage ranges are limited to one of the first to fifth voltages ranges, and
wherein one of the controlled rectifier, the at least one DC to DC converter, and the at least one DC to AC converter is configured to control the DC voltage of the DC link depending on whether the voltage of the DC link is in one of the first voltage range, the second voltage range, the third voltage range, the fourth voltage range, and the fifth voltage range.

17. A system according to claim 2, wherein the first to sixth voltage ranges do not overlap each other such that voltage values in one of the first to fifth voltage ranges are limited to one of the first to sixth voltage ranges, and
wherein one of the controlled rectifier, the at least one DC to DC converter, the at least one DC to AC converter, and the braking chopper is configured to control the DC voltage of the DC link depending on whether the voltage of the DC link is in one of the first voltage range, the second voltage range, the third voltage range, the fourth voltage range, the fifth voltage range, and the sixth voltage range.

18. A method according to claim 15, wherein the first to fifth voltage ranges do not overlap each other such that voltage values in one of the first to fifth voltage ranges are limited to one of the first to fifth voltages ranges, and
wherein one of the controlled rectifier, the at least one DC to DC converter, and the at least one DC to AC converter is configured to control the DC voltage of the DC link depending on whether the voltage of the DC link is in one of the first voltage range, the second voltage range, the third voltage range, the fourth voltage range, and the fifth voltage range.

19. A method according to claim 15, wherein the electrical system includes a braking chopper connected to the DC link, and
wherein the method comprises controlling, by the braking chopper, the voltage of the DC link by dissipating power from the DC link when the voltage of the DC link is in a sixth voltage range, the sixth voltage range having higher voltage values than the second voltage range and lower voltage values than the fourth voltage range.

20. A method according to claim 19, wherein the first to sixth voltage ranges do not overlap each other such that voltage values in one of the first to sixth voltage ranges are limited to one of the first to sixth voltage ranges, and
wherein one of the controlled rectifier, the at least one DC to DC converter, the at least one DC to AC converter, and the braking chopper controls the DC voltage of the DC link depending on whether the voltage of the DC link is in one of the first voltage range, the second voltage range, the third voltage range, the fourth voltage range, the fifth voltage range, and the sixth voltage range.

* * * * *